United States Patent [19]

Frankforter

[11] 4,303,380
[45] Dec. 1, 1981

[54] TIRE REPAIR DEVICE

[75] Inventor: Norris K. Frankforter, Lincoln, Nebr.

[73] Assignee: Lincoln Manufacturing Co., Lincoln, Nebr.

[21] Appl. No.: 130,575

[22] Filed: Mar. 14, 1980

[51] Int. Cl.³ ............................................. B60C 25/16
[52] U.S. Cl. ..................................... 425/27; 100/211; 100/226; 100/231; 156/97; 156/583.3; 156/583.6; 156/583.7; 264/36; 425/11
[58] Field of Search ................... 156/97, 583.3, 583.6, 156/583.7, 272; 81/15.2, 15.5, 15.7; 425/11, 12, 14, 17, 26, 27; 100/93 P, 211, 226, 227, 231, 240, 245; 264/36

[56] References Cited

U.S. PATENT DOCUMENTS

| | | | |
|---|---|---|---|
| 2,150,267 | 3/1939 | Delano | 425/11 |
| 2,447,740 | 8/1948 | Crowley | 156/583.7 |
| 2,837,767 | 6/1958 | Macdonald | 156/97 |
| 3,172,158 | 3/1965 | Herman et al. | 425/12 |
| 3,553,779 | 1/1971 | Miller | 425/12 |
| 3,919,021 | 11/1975 | Whittle | 156/97 |
| 3,940,463 | 2/1976 | Nicholson | 264/36 |
| 4,017,352 | 4/1977 | Vannan | 425/26 |

Primary Examiner—John E. Kittle
Attorney, Agent, or Firm—Lowe, Kokjer, Kircher, Wharton & Bowman

[57] ABSTRACT

A tire repair device which vulcanizes an uncured rubber repair plug built in a damaged area of the tire. The frame of the device is in the form of a C-clamp having a heated backing plate which opposes a heated pressure pad. The pad is carried in a cylinder which also receives a sealing piston forming a pressure chamber behind the pad. Air under pressure is applied to the pressure chamber to force the pressure pad against the damaged area of the tire during vulcanization. The pressure pad is flexible in order to conform to the tire surface against which it is pressed in opposition to the backing plate.

4 Claims, 2 Drawing Figures

TIRE REPAIR DEVICE

BACKGROUND AND SUMMARY OF THE INVENTION

This invention relates generally to the repair of tires and deals more particularly with a device for repairing tires by vulcanizing a repair plug in the damaged area of the tire.

Although various types of devices have been proposed for use in repairing damaged tires, none of them have been entirely satisfactory in all respects. Devices such as those disclosed in U.S. Pat. No. 3,172,158 to Herman et al and U.S. Pat. No. 3,553,779 to Miller are characterized by undue complexity which results in high costs and unreliability. Due in large part to the irregular and varying surface contours of tires, it is difficult to maintain the area undergoing repair under continuous and constant pressure during vulcanization. As a consequence, improper pressure is applied and the tire is not effectively repaired.

The present invention has, as its primary object, the provision of an improved tire repair device having a pressure pad which readily conforms to the varying surface contours of the tire and which effectively prevents the escape of uncured repair material during vulcanization.

Another object of the invention is to provide a tire repair device of the character described which applies continuous and constant pressure to the area of the tire undergoing repair.

Yet another object of the invention is to provide a tire repair device of the character described which effects proper heating of the area of the tire undergoing repair.

An additional object of the invention is to provide a tire repair device of the character described which may be applied to any portion of the tire sidewalls, shoulder or tread area.

A still further object of the invention is to provide a tire repair device of the character described which is simple and economical to construct and use and which accommodates tires having various sizes and styles.

Other and further objects of the invention, together with the features of novelty appurtenant thereto will appear in the course of the following description.

DETAILED DESCRIPTION OF THE INVENTION

Figure 1:
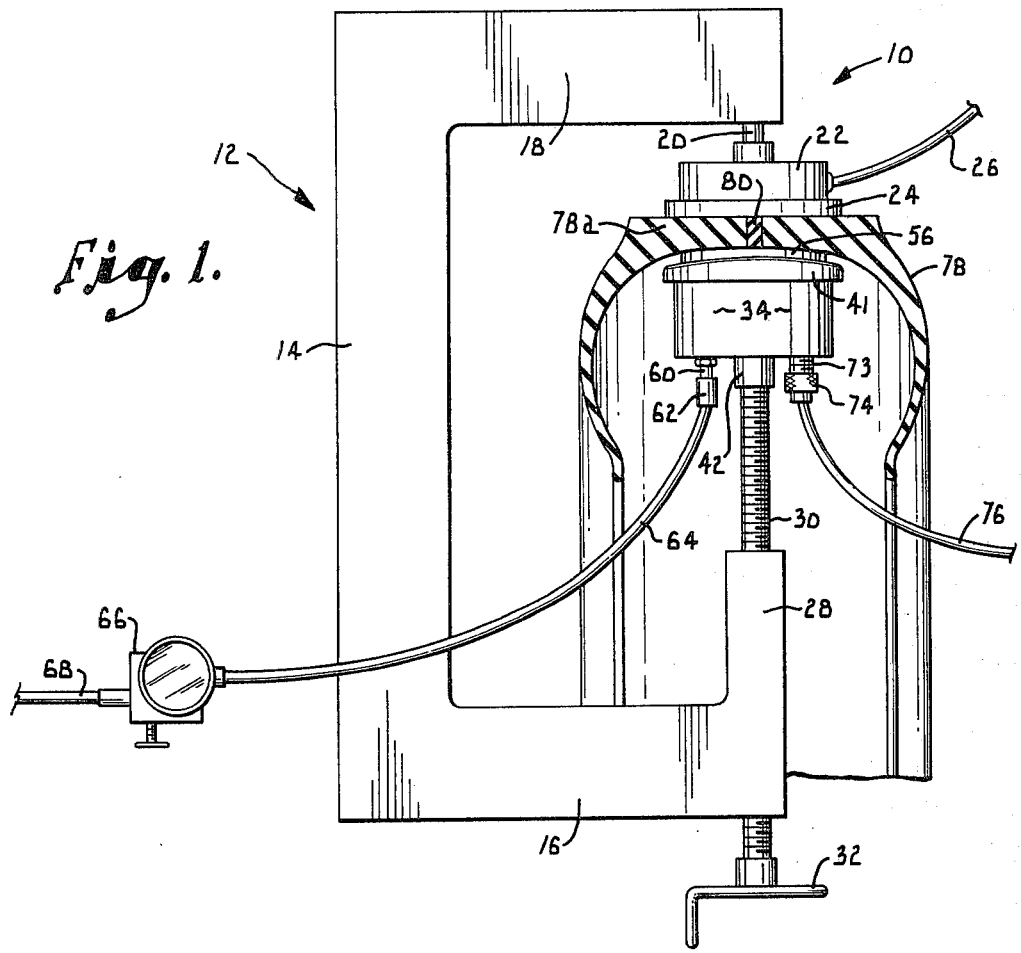
Figure 2:
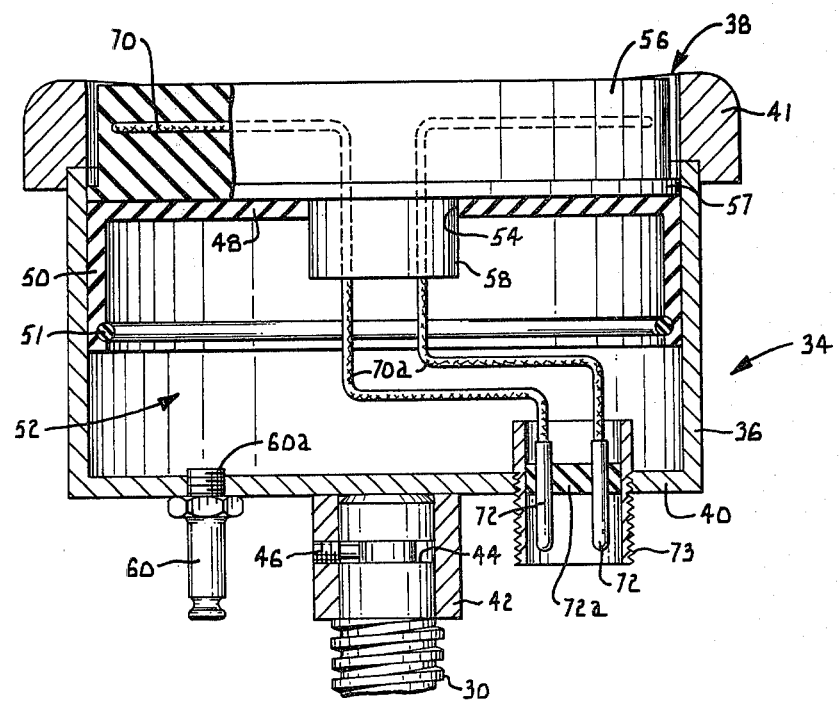

In the accompanying drawing which forms a part of the specification and is to be read in conjunction therewith and in which like reference numerals are used to indicate like parts in the various views:

FIG. 1 is an elevational view showing a tire repair device constructed according to the present invention applied to a damaged area of a tire, the tire being shown fragmentarily in section; and FIG. 2 is a fragmentary sectional view on an enlarged scale illustrating the pressure pad assembly included in the tire repair device.

Referring now to the drawing in detail, reference numeral 10 generally designates a tire repair device constructed in accordance with a preferred embodiment of the present invention. The device 10 includes a light weight "C" shaped frame 12 having a base 14 and lower and upper arms 16 and 18, respectively, extending from the ends of base 14. Mounted to the free or outer end of the upper arm 18 is a short post 20 which receives a housing 22. A back up plate 24 is mounted on the bottom of the housing 22. Plate 24 can be one of several circular metal plates having various contours to be used in accordance with spotter placement on the tire. A cord 26 leads into housing 22 and contains electrically resistive heater wires (not shown) which heat back up plate 24 in a conventional manner upon application of electric current to the heater wires.

A depending leg 28 extends upwardly from the free or outer end of the lower arm 16. Threaded through an internally threaded passage in leg 28 is a screw 30 having a handle 32 mounted on its bottom end below arm 16. The top end of screw 30 carries a pressure pad assembly which is generally designated by reference numeral 34.

Referring now to FIG. 2 in particular, the pressure pad assembly 34 includes a cylinder 36 which serves as a housing for the components of the pad assembly. Cylinder 36 is open at its upper end 38 and has an end wall 40 forming a closed end of the cylinder opposite the open end 38. Circumscribing the open end 38 is a permanently attached contoured metal ring 41. This ring 41 gives the cylinder a contour similar to that of the tire and consequently helps retain the pad. Ring 41 is secured to the edge of cylinder 36. A small sleeve 42 is mounted centrally to the outer surface of end wall 40 and receives the upper end of screw 30. The upper end of the screw has an annular groove 44 which receives the end of a small screw 46 threaded through sleeve 42. It is thus apparent that turning of handle 32 moves the shaft of screw 30 up and down in order to raise and lower cylinder 36 relative to the opposed back up plate 24. Alternative arrangements for mounting cylinder 36 on screw 30 may be utilized.

With continued reference to FIG. 2, a piston 48 is mounted within the hollow interior of cylinder 36. Piston 48 has a circular disc-like body and a peripheral skirt portion 50 which projects from the edge of the piston toward the end wall 40 of the cylinder. A rubber "O" ring 51 is embedded in the lower edge of skirt 50 to aid in sealing of piston 48 when exposed to severe contours. The skirt 50 seals against the side wall of cylinder 36. A fluid tight air chamber 52 is thus formed in cylinder 36 between end wall 40 and the body of piston 48. Piston 48 has a circular opening 54 formed in its center.

A circular pressure pad 56 having a peripheral lip 57 contacting the wall of cylinder 36 is mounted within cylinder 36 adjacent the outer end 38. Pad 56 is constructed of a material such as silicon rubber which is flexible enough to conform to the surface of a tire undergoing repair. Pad 56 is engaged by the body of the piston 48 and is urged by the piston outwardly toward the open upper end of cylinder 36, as will be more fully explained. Pad 56 has a central boss 58 which projects downwardly through opening 54 of the piston and is sealed thereto.

Air under pressure is supplied to chamber 52 through a fitting 60 which is mounted to end wall 40. The fitting 60 has a threaded upper end 60a which is threaded through and sealed to an internally threaded opening formed in wall 40. The fitting is constructed in a conventional manner to receive a quick connect coupling 62 (FIG. 1) carried on the end of an air hose 64. A conventional pressure regulator 66 connects with the oppose end of hose 64 and may be permanently mounted to frame 12 if desired. A supply line 68 leading from a source of air under pressure (not shown) connects with the opposite side of the pressure regulator to deliver incoming air thereto.

The pressure pad 56 is heated by a heater wire 70 which is embedded in the pressure pad. For more uniform heating of the pad, wire 70 is preferably arranged in a circle oriented parallel to and spaced from the outer face of the pad. Wire 70 is in the form of an electrically resistive conductor which is encased within an insulating sheath. Wire 70 has double insulated lead portions 70a which extend through boss 58 of the pressure pad and through air chamber 52 to connection with a pair of prongs 72. Prongs 72 are mounted to a phenolic type material 72a which is permanently contained within an externally threaded tube 73 that screws into an internally threaded hole formed in wall 40. The prongs are adapted to receive a plug 74 (FIG. 1) carried on the end of a cord 76. The opposite end of cord 76 may be connected with an electric current source in order to apply current to the heater wire 70.

In use, the screw handle 32 is initially turned in a direction to lower pad assembly 34 sufficiently to permit a damaged tire 78 to fit between backing plate 24 and the open end 38 of cylinder 36. An uncured tire repair plug 80 is built in the hole in the tire, and back up plate 24 is applied to the damaged area of the tire, as shown in FIG. 1. Handle 32 is then turned to raise cylinder 36 until its open end 38 with attached contour ring 41 is positioned immediately below the damaged area of the tire. Current is applied to cord 26 in order to heat back up plate 24 to a preselected temperature, and current is also applied to cord 76 in order to heat the pressure pad 56 to the desired temperature. Thermostats (not shown) may be used to maintain the temperature of plate 24 and pad 56 at the desired level.

With pressure regulator 66 set at the desired pressure level, air is supplied under pressure to hoses 68 and 64 and through fitting 60 into air chamber 52. The air pressure urges piston 48 upwardly, and the piston in turn pushes pressure pad 56 upwardly against the damaged area of the tire and against the uncured rubber plug 80. The heat applied to the tire and plug 80 by plate 24 and pad 56, together with the pressure applied by the pad, vulcanizes plug 80 to effect repair of the damaged area of the tire. After the tire has been repaired the air line 68 must be disconnected before any attempt is made to lower pad assembly. The pressure pad assembly 34 is then lowered so that the tire and frame may be separated from one another.

Pressure pad 56 is constructed of a material which is flexible enough to permit the pad to readily conform to the contour of the tire surface to which the pad is applied. This assures that a uniform and consistent pressure is applied during vulcanization to uncured plug 80. It has been found that silicone rubber possesses the required resiliency and flexibility and also has good heating characteristics. Accordingly, pressure pad 56 is preferably constructed of silicone rubber. The same material may be used to form piston 48. Leakage of air from air chamber 52 is prevented by the peripheral skirt 50 which is pressed outwardly by the air pressure in chamber 52 into firm sealing contact with the side wall of cylinder 36.

It is contemplated that the pressure pad 56 may have an outer surface which is contoured in the appropriate shape when unusual contours are to undergo repair, such as the shoulder area 78a of a tire. In this case, the contour of pad 56 is formed to correspond generally to the shoulder contour, and the surface of piston 48 which engages the pressure pad may be shaped to conform to the pad surface which it contacts. The manner in which the device is applied to the side walls or shoulder areas of tires is substantially the same as described in connection with repair of the thread area.

From the foregoing, it will be seen that this invention is one well adapted to attain all the ends and objects herein above set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. Tire repair apparatus for use in vulcanizing uncured rubber inserted in a damaged area of a tire casing, said apparatus comprising:
   a frame;
   a backing member on said frame contoured to substantially conform with the shape of the surface of the tire casing surrounding the damaged area;
   a housing on said frame having an open end spaced from said backing member in opposition thereto to permit the damaged portion of the tire casing to be interposed between the backing member and the open end of the housing;
   a resilient pressure pad mounted in said housing adjacent the open end thereof for movement inwardly and outwardly in the housing away from and toward the backing member;
   an electrically resistive heating element embedded in said pad and adapted to receive electric current for heating of the pad;
   means for heating said backing member;
   a piston in said housing sealed thereto and abutting said pressure pad to force the latter outwardly upon outward movement of the piston;
   a fluid tight pressure chamber in said housing behind said piston; and
   means for applying fluid pressure to said pressure chamber to drive said piston outwardly and effect pressing of said pad against the surface of the tire casing adjacent the damaged area, with said heating element and heating means being operable to heat both sides of the tire casing adjacent the damaged area.

2. Apparatus as set forth in claim 1, wherein said piston includes a body portion abutting said pressure pad and a peripheral skirt extending from said body portion and sealing against said housing.

3. Apparatus as set forth in claim 1, wherein said pressure pad is constructed of silicone rubber.

4. Apparatus as set forth in claim 1, wherein:
said pressure pad has a boss thereon projecting through said piston into said pressure chamber; and
said heating element has lead wires connected therewith, said lead wires extending through said pressure chamber and boss to connection with the heating element.

* * * * *